(12) United States Patent
Fujimori

(10) Patent No.: US 8,199,350 B2
(45) Date of Patent: Jun. 12, 2012

(54) VARIABLE DATA PRINTING METHOD USING VARIABLE TEXT COLOR DEPENDING ON BACKGROUND

(75) Inventor: Toshiro Fujimori, Laguna Beach, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 435 days.

(21) Appl. No.: 12/345,656

(22) Filed: Dec. 29, 2008

(65) Prior Publication Data

US 2010/0165378 A1 Jul. 1, 2010

(51) Int. Cl.
*G06F 3/12* (2006.01)
(52) U.S. Cl. ............... 358/1.15; 358/1.18; 382/162
(58) Field of Classification Search .......... 345/597, 345/617; 382/167, 176
See application file for complete search history.

(56) References Cited

U.S. PATENT DOCUMENTS

| | | | | |
|---|---|---|---|---|
| 6,809,741 | B1 * | 10/2004 | Bates et al. | 345/597 |
| 7,352,912 | B2 * | 4/2008 | Eschbach | 382/264 |
| 2002/0044686 | A1 | 4/2002 | Yamazaki | |
| 2003/0035138 | A1 | 2/2003 | Schilling | |
| 2006/0041443 | A1 * | 2/2006 | Horvath, Jr. | 705/1 |
| 2006/0126932 | A1 * | 6/2006 | Eschbach | 382/173 |
| 2008/0267491 | A1 * | 10/2008 | Matsui | 382/162 |

* cited by examiner

*Primary Examiner* — Twyler Haskins
*Assistant Examiner* — Christopher D Wait
(74) *Attorney, Agent, or Firm* — Chen Yoshimura LLP

(57) ABSTRACT

An improved variable data printing (VDP) method is disclosed. A VDP database contains variable data and form data. The variable data includes a plurality of entries each having a plurality attributes. The form data includes images. Each printed piece of a VDP production includes variable data and form data selected based on the variable data attributes. When the printed pieces include a background image and foreground text to be printed over the background image, and when different pieces in the VDP production have different background image, the method automatically selects a text color to print the foreground text over the background image on each piece to enhance visibility and/or aesthetic appearance. In addition, the foreground text color for each piece may be selected based on additional attributes of the variable data.

9 Claims, 2 Drawing Sheets

VARIABLE DATA PRINTING METHOD USING VARIABLE TEXT COLOR DEPENDING ON BACKGROUND

BACKGROUND OF THE INVENTION

1. Field of the Invention

This invention relates to a variable data printing method, and in particular, it relates to a variable data printing method that automatically adjusts text colors based on variable contents.

2. Description of Related Art

Variable data printing (VDP) is a form of printing multiple pieces (often large numbers of pieces) where each piece contains a combination of form content (common to all of the pieces or a large subset of the pieces) and variable content (different for each piece, such as name and address). VDP are widely used to print personalized letters, direct marketing materials, billing statements, etc. Typically, a database or external file is used to provide the information for the variable content. Form content is also provided as external files or a database. For example, the variable data and form data may be provided in a PDF file.

When text is printed over a background, either a solid background color or a background image, it is desired to select a color of the text so that the text will be clearly visible over the background. Methods for adjusting text color in a document based on background are known. For example, in U.S. Pat. No. 6,809,741, "A color contrast adjuster is disclosed that automatically selects and applies a new color combination for text and background based on the current color combination for the text and background, if the current color combination is a problem color combination. The text can be any text object (such as a hypertext link, bold text, underline text, groups of text etc.) and the background can be any background object whose color can be determined (such as a solid color, a button, a global interchange format file, etc.)." (Abstract.) In another example, U.S. Patent Application Publication No. 2002/0044686 describes "An image processing device having an image processing unit 10 that adjusts colors of the foreground image data that are approximately equal to a uniform color that makes the boundary between the foreground image data and the background image data recognizable to all the colors of the background image data that serves as the foreground image data's back ground, and synthesizes the foreground image data and the background image data." (Abstract.)

SUMMARY

The present invention is directed to an improved variable data printing (VDP) method.

An object of the present invention is to automatically select text colors for printing text over background in a VDP production.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a variable data printing (VDP) method implemented in a data processing apparatus, which includes: (a) receiving VDP data including variable data, form data and a plurality of association rules, the variable data including a plurality of entries each having a plurality of attributes, the form data including a plurality of background images, the association rules defining associations between variable data attributes and form data; for each entry in the variable data, (b) obtaining at least one attribute; (c) selecting a background image from the form data based on the at least one attribute; (d) determining a foreground text color for printing text over the background image; and (e) generating an image based on variable data and form data selected using the association rules and based on the foreground text color determined in step (d), the image including the background image and foreground text in the foreground text color over the background image.

In another aspect, the present invention provides a computer program product that causes a data processing apparatus to perform the above method.

It is to be understood that both the foregoing general description and the following detailed description are exemplary and explanatory and are intended to provide further explanation of the invention as claimed.

DETAILED DESCRIPTION OF PREFERRED EMBODIMENTS

The following descriptions uses a direct marketing campaign as an example of a VDP application, but the method can be used in many other applications. To produce a VDP production, input data is provided that includes variable data and form data. Variable data, which may be provided in the form of a database, includes a plurality of entries each associated with an individual as a target of the marketing campaign. Each entry in the variable data includes a plurality of attributes such as the individual's name and address, demographic information, behavioral history, other specific information, etc. Not all variable data are printed. The form data includes contents to be printed, which may be text, graphics, images, etc. A selected combination of contents will be printed on each piece of the VDP production. The input data also includes a set of association rules that define the associations between variable data attributes and form data. For example, the rules may specify what combination of form data contents is to be printed for each individual based on his attributes such as age, interest, etc. Such rules are typically pre-defined by the creator of the marketing campaign based on market research and models. When performing VDP printing, the appropriate form data is selected for each entry based on it attributes, and combined with variable data (e.g. the name and address) to generate each printed piece.

Figure 1:
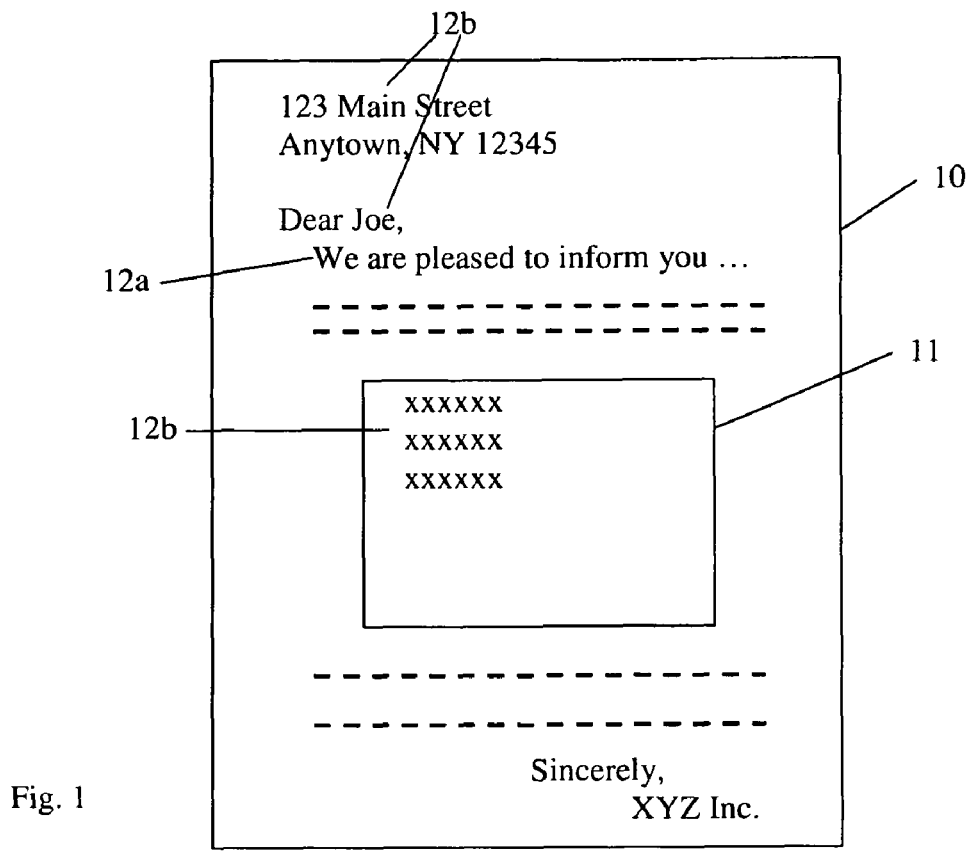
FIG. 1 schematically illustrates a printed piece of a VDP production that includes a background and foreground text.

As schematically illustrated in FIG. 1, typically, each printed piece 10 in a VDP production includes images 11 and text 12 (12a, 12b, etc.). The images 11 are typically selected from a number of images provided as form content based on the association rules, so different printed pieces may have different image printed on them. The text 12 may include form text 12*a* and variable text 12*b* (such as name, address, etc.). Sometimes, text is printed over an image. In other words, the image becomes a background for the text (foreground text). Depending on the image, it may be desirable to use different colors to print the foreground text to enhance its visibility or aesthetic appearance. For example, if the image to be printed on a first piece has a generally light tone in the image area where text will be printed, then a black or blue color may be used to print the text over the image. If the image to be printed on a second piece has a generally dark background in the area where text will be printed, then a white or yellow color may be used to print the text over the image.

The foreground text color may be automatically determined by a program. Methods for determining appropriate foreground text color for a given background color or color combination are generally known. The details of such methods are not describes here as the reader is presumed to be familiar with such methods or can readily learn how to implement such a method from known art. Alternatively, the foreground text color may be determined manually by a user. In one embodiment, the foreground text color is determined (either automatically or manually) beforehand for each image in the form data and stored in the VDP database or a separate file. In other words, the VDP database contains an association rule that specifies a foreground text color for each image.

Figure 4:
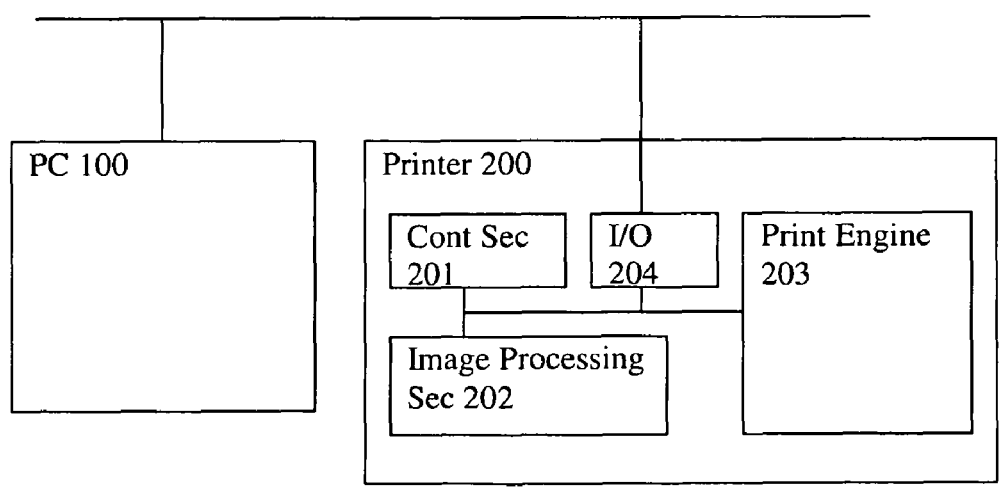
FIG. 4 illustrates a printer system in which methods according to embodiments of the present invention may be implemented.

FIG. 4 illustrates a printer system in which embodiments of the present invention may be implemented. The system includes a printer 200, which may be connected to a computer 100 via a network, a connection cable, etc. As schematically shown, the printer 200 includes a control section 201, an image processing section 202, a print engine 203, and an input/output (I/O) section 204. The control section 201 includes a central processing unit (CPU), a random access memory (RAM), and a read only memory (ROM). The CPU reads out various software programs stored in the ROM into the RAM to control the internal sections 202 through 204 of the printer 200. The data received from the computer 100 is temporally stored in the RAM and processed. Raster images are generated by the CPU performing as a raster image processor (RIP). The image processing section 202 carries out various image processing on rasterized image data under the control of the CPU 201, and sends the processed image data to the print engine 203. The print engine forms an image on a recording sheet based on the image data sent from the image processing section 202.

Figure 2:
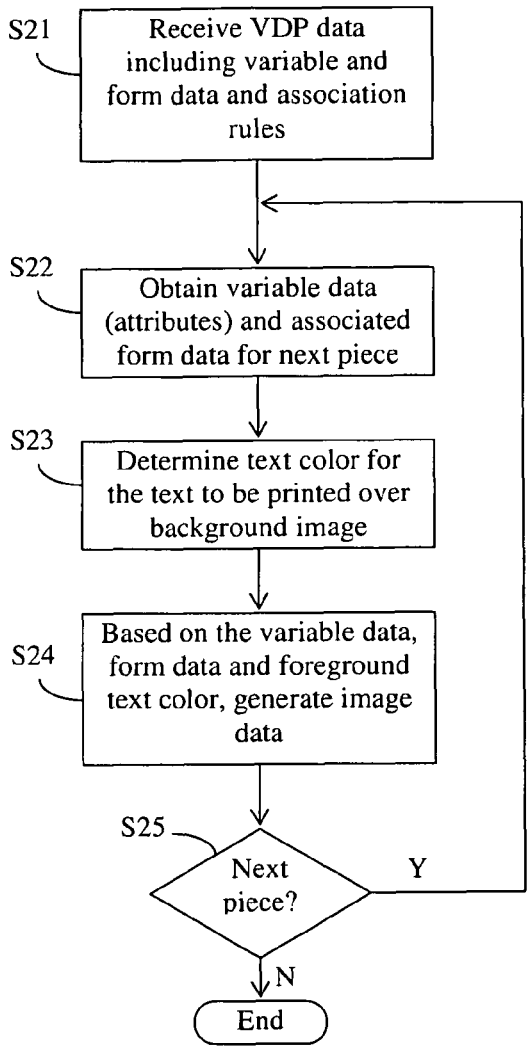
FIG. 2 illustrates a VDP production method that automatically selects a foreground text color according to an embodiment of the present invention.

FIG. 2 illustrates a method of performing VDP printing using variable foreground text color over image background. In a preferred embodiment, the method is performed by a printer, for example, in the system shown in FIG. 4, by the control section 201 of the printer 200 executing a VDP program. First, the program receives the VDP data, including the variable data, the form data, and the association rules (step S21). The data may be received, for example, from an external computer 100 connected to the printer 200. For each entry in the variable data, the program obtains the attributes of the variable data, such as name, address, interest, etc., and obtains the form data to be printed on the piece based on the association rules, such as images, text, etc. (step S22). Then, the program determines which text (foreground text) will be printed over a background image, and determines the text color for the foreground text (step S23). As described earlier, a foreground text color may be selected for each background image beforehand (i.e. before processing each piece for printing, either automatically or manually) and stored in the VDP database as an association rule. In such a case, step 23 includes retrieving the foreground text color from the VDP database based on the background image selected in step S22. Alternatively, in step S23 the program determines, for the current piece being processed, the foreground text color based on the background image colors.

Based on the variable data and form data, as well as the foreground text color, the control section 201 generates image data to be printed (step S24). Methods for generating image data with foreground text in the specified color over the background image are generally known in the art. The program processes the next entry in the variable data ("Y" in step S25) in the same manner by repeating steps S22 to S24 until all entries are processed ("N" in step S25).

Figure 3:
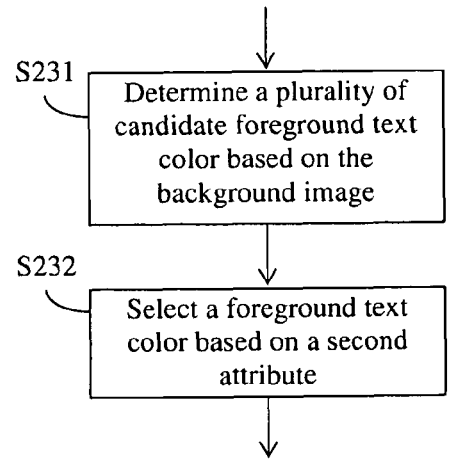
FIG. 3 illustrates a step of selecting a foreground text color according to a further embodiment of the present invention.

In addition, the method may also select a foreground text color and/or normal text color (i.e. color for printing text that does not appear over a background image) based on additional attributes for each entry in the variable database. For example, the background image may be selected based on a first attribute (e.g. interest), and the foreground text color may be selected, from a number of suitable colors for that background image, based on a second attribute (e.g. gender). FIG. 3 illustrates the process of step S23 in this embodiment. Thus, step S23 includes first determining a plurality of candidate foreground text colors based on the colors of the background image (step S231). Again, these candidate foreground colors may be determined beforehand for each background image and stored in the VDP database. Then the program selects one foreground text color from the candidate colors based on a second attribute of the variable data (step S232). The second attribute is different from the first attribute that was used to select the background image. In other words, in this embodiment, the foreground text color is determined by two attributes of the variable data.

Some of the steps in the above-described method may also be performed by an application program on the computer 100. In such as configuration, the computer 100 carries out steps S21 to S23 of FIG. 2, and then generates a print job for each piece, which specifies the variable data and form data to be printed for the piece as well as the foreground text color. The computer submits the print job to the printer, and the latter executes the print jot to print the piece.

The advantages of the VDP method that automatically selects foreground text color include enhanced visibility and aesthetic appearance. Although known art teaches using different foreground text color for different background colors, applying such a method in the VDP production improves the results of the VDP production.

It will be apparent to those skilled in the art that various modification and variations can be made in the VDP printing method of the present invention without departing from the spirit or scope of the invention. Thus, it is intended that the present invention cover modifications and variations that come within the scope of the appended claims and their equivalents.

What is claimed is:

1. A variable data printing (VDP) method implemented in a data processing apparatus, comprising:
    (i) receiving VDP data including variable data, form data and a plurality of association rules from a VDP database, the variable data including a plurality of entries each having a plurality of attributes, the form data including a plurality of background images, the association rules defining associations between variable data attributes and form data;
    (ii) for each entry in the variable data,
        (a) obtaining a color association rule as a separate file from the VDP database specifying a foreground text color for each background image in the form data;
        (b) obtaining at least one attribute;

(c) selecting a background image from the form data based on the at least one attribute;

(d) selecting a foreground text color based on the background image obtained in step (c) and the color association rule for printing text over the background image; and (e) generating an image based on variable data and form data selected using the association rules and based on the foreground text color determined in step (d), the image including the background image and foreground text in the foreground text color over the background image.

2. The method of claim 1, wherein the foreground text color for each background image in the color association rule is determined automatically by a computer.

3. The method of claim 1, wherein the foreground text color for each background image in the color association rule is determined manually by a user.

4. The method of claim 1, wherein step (b) includes obtaining at least two attributes, wherein in step (c) the background image is selected based on a first one of the at least two attributes;

wherein step (d) includes:

(d1) selecting a plurality of candidate foreground text colors based on the background image selected in step (c); and (d2) selecting one foreground color from the plurality of candidate foreground colors based on a second one of the at least two attributes.

5. The method of claim 1, further comprising printing the image generated in step (e).

6. A computer program product comprising a non-transitory computer usable medium having a computer readable program code embedded therein for controlling a data processing apparatus, the computer readable program code configured to cause the data processing apparatus to execute a variable data printing (VDP) process, the process comprising:

(i) receiving VDP data including variable data, form data and a plurality of association rules from a VDP database, the variable data including a plurality of entries each having a plurality of attributes, the form data including a plurality of background images, the association rules defining associations between variable data attributes and form data;

(ii) for each entry in the variable data, (a) obtaining a color association rule as a separate file from the VDP database specifying a foreground text color for each background image in the form data;

(b) obtaining at least one attribute;

(c) selecting a background image from the form data based on the at least one attribute;

(d) selecting a foreground text color based on the background image obtained in step (c) and the color association rule for printing text over the background image; and (e) generating an image based on variable data and form data selected using the association rules and based on the foreground text color determined in step (d), the image including the background image and foreground text in the foreground text color over the background image.

7. The computer program product of claim 6, wherein the foreground text color for each background image in the color association rule is determined automatically by a computer.

8. The computer program product of claim 6, wherein the foreground text color for each background image in the color association rule is determined manually by a user.

9. The computer program product of claim 6, wherein step (b) includes obtaining at least two attributes, wherein in step (c) the background image is selected based on a first one of the at least two attributes;

wherein step (d) includes:

(d1) selecting a plurality of candidate foreground text colors based on the background image selected in step (c); and (d2) selecting one foreground color from the plurality of candidate foreground colors based on a second one of the at least two attributes.

\* \* \* \* \*